United States Patent Office 3,347,873
Patented Oct. 17, 1967

3,347,873
SEPARATION OF ORGANIC COMPOUNDS
Ralph J. Leary, Cranford, N.J., assignor to Esso Research and Engineering Company, a corporation of Delaware
No Drawing. Filed Dec. 21, 1960, Ser. No. 77,468
6 Claims. (Cl. 260—347.7)

This invention relates to a method of separating saturated from unsaturated $NF_2$-containing compounds by treating a mixture of such compounds with liquid nitrogen tetroxide ($N_2O_4$) at low temperatures and distilling the $NF_2$ saturated compounds from a resulting reaction product of the unsaturated compounds which by the treatment form less volatile $N_2O_4$ adducts.

In forming high-energy $NF_2$-containing oxidizers, used as such in rocket propellant composites or used to make high-energy polymer binders for the composites, unsaturated organic compounds, e.g. polyenes, are reacted with $N_2F_4$. Many of the reactions involve addition of $N_2F_4$ to double bonds in the unsaturated organic compounds to saturate the double bonds and result in a crude product which is a mixture of compounds varying in $NF_2$ content and degree of unsaturation. Then a separation of the saturated components having a higher $NF_2$ content from unsaturated components having a lower $NF_2$ content in the product mixture is often of value or essential. The separation is essential in the recovery of the higher-energy compounds in which the double bonds are fully saturated by addition of $N_2F_4$.

Of particular interest for making high-energy oxidizers, some of which can be used as intermediates, are dienes, trienes, tetraenes, unsaturated cyclic hydrocarbons, and unsaturated heterocyclic carbon and oxygen compounds, e.g. butadiene, hexatrienes, cyclic dienes, furan and dioxadiene. Some of the unsaturated organic compounds react better than others under certain conditions with $N_2F_4$; and in all instances particular steps and cautions have to be used on account of the explosive potentialities of the $NF_2$-containing products.

The method of separation provided by the present invention now has been found to have unexpectedly good capability for removal of the desired saturated $NF_2$-containing compounds, as a purer product, with a sufficiently mild reaction that avoids detonation, uses few steps, and reduces the chance of loss. The low temperature reaction with liquid $N_2O_4$ is quick, goes to completion, and does not involve detrimental side reactions of oxidation.

In addition to its value for accomplishing the separation of $N_2F_4$-containing components in a mixture, the $N_2O_4$ reaction serves in a method for proving structure, because the reaction goes well to completion without causing complicating side reactions. By comparing gas chromatography (GC) tracings before and after separations of unsaturated components with use of the $N_2O_4$ treatment, one can assign olefinic structures to the GC peaks that are made to disappear and saturated structures to the peaks that remain after these separations.

To carry out the separation steps of the present invention, the mixture of $NF_2$-saturated and unsaturated components is treated with liquid $N_2O_4$ at sufficiently low temperature, e.g. about $-10°$ C. to $+10°$ C. to prevent formation of $NO_2$, the presence of which is indicated by yellowing color imparted to the liquid $N_2O_4$. The liquid $N_2O_4$ is added to the mixture at a rate to effect satisfactory reaction of one molecule of $N_2O_4$ per double bond without more than a small excess of $N_2O_4$. Then after a brief period, any excess $N_2O_4$ is removed from the mixture with the aid of an inert gas and/or vacuum. The remaining treated mixture is then subjected to conditions for distillation of $N_2F_4$ saturated components from the $N_2O_4$ reacted components, the latter having been unsaturated prior to reaction with $N_2O_4$. The distillation of the $N_2F_4$ saturated components under vacuum and at temperatures in the range of about 20° C. to 100° C. permits $N_2F_4$ components having from 4 to 10 carbons per molecule with 4 to 8 $NF_2$ groups per molecule to be recovered as distillate product.

Diluents which do not adversely affected the $N_2O_4$ reaction and which can be fractionated from the distillate product may be used, e.g. $C_2$ to $C_4$ dialkyl ethers.

The residual products obtained from the reaction of $N_2O_4$ with the unsaturated compounds have been found to have adequate thermal stability to permit the separation, and such residual products from unsaturated hydrocarbons are useful as fairly high-energy products. The $N_2O_4$ reaction with the unsaturated compounds may be complex and result in the addition of various nitrogen- and oxygen-containing groups to the double bond, e.g. a nitro group or a nitroso group and nitrate group.

The following examples illustrate the separation of $NF_2$-saturated components from unsaturated components in a mixture, e.g. a mixture of tetrakis ($NF_2$) adduct having no remaining double bond from a bis ($NF_2$) adduct having a double bond.

EXAMPLE I

*Separation of tetrakis (difluoramino) dioxane from bis (difluoramino) dioxene*

To liquid $N_2O_4$ at 0° C. was added dropwise a mixture of bis and tetrakis ($NF_2$) adducts of dioxadiene. The reaction mixture was allowed to stand at 0° C. for 30 minutes before any excess $N_2O_4$ was evaporated with aid of a stream of nitrogen. The tetrakis ($NF_2$) adduct was distilled off and collected as distillate product under vacuum.

The following table shows data on GC scans of the starting mixture and the product.

TABLE 1.—SEPARATION OF TETRAKIS $NF_2$ ADDUCT OF DIOXADIENE

| GC Ret. Time (OH) | Percent in starting Material [1] | Percent In Product |
|---|---|---|
| 2.2 Bis Adduct | 4.3 | 0.0 |
| 4.0 Tetrakis Adduct | 30.9 | 31.1 |
| 5.4 Tetrakis Adduct | 33.2 | 34.1 |
| 7.9 Tetrakis Adduct | 25.9 | 28.1 |
| 9.1 Tetrakis Adduct | 5.7 | 6.6 |

[1] All percents are based on area of GC peak.

EXAMPLE II

*Separation of tetrakis (difluoramino) tetrahydrofuran, as $NF_2$ saturated, from bis (difluoramino) dihydrofuran*

Using the procedure given in Example I, a mixture of bis ($NF_2$) and tetrakis ($NF_2$) adducts of furan were treated with liquid $N_2O_4$ at 0° C., and the tetrakis adduct was recovered as distillate. Analyses of the starting mixture and recovered distillate product are shown in the following table.

TABLE 2.—SEPARATION OF TETRAKIS $NF_2$ ADDUCT OF FURAN

| GC Ret. Time (OH) | Percent in starting Material [1] | Percent In Product |
|---|---|---|
| 1.60 (Bis Adduct) | 27.6 | 0.0 |
| 2.69 Tetrakis Adduct | 42.1 | 62.1 |
| 3.78 Tetrakis Adduct | 30.3 | 37.9 |

[1] All percent are based on area of GC peak.

The data obtained show separation of the unsaturated $NF_2$ adducts so completely that the recovered distillate products were free of the unsaturated compounds.

Any mixture treated may contain the precursor unsaturated compound having 2 or more double bonds to which $NF_2$ groups were not added, and these unsaturated compounds are also reacted with the $N_2O_4$, so that they remain in the residue. For example, furan present in the mixture of bis and tetrakis $NF_2$ adducts of furan is reacted with $N_2O_4$ in a proportion of 2 mols $N_2O_4$ per mol furan and forms products less volatile than the tetrakis $NF_2$ adduct to be recovered as the volatilized $NF_2$ saturated adduct.

EXAMPLE III

Using the procedure of Example I, a mixture of unsaturated bis, tetrakis and hexakis $NF_2$ adducts of hexatriene is treated with liquid $N_2O_4$ at 0° C. to convert the lower $NF_2$ adduct components to saturated adducts of both $NF_2$ and nitrogen oxide groups. The resulting product has a higher energy value than the starting mixture and can be employed as such in a propellant composite. Otherwise the higher $NF_2$ saturated adduct material can be separated, as by vacuum distillation.

As shown in Example III, conjugated or non-conjugated polyenes, and mixtures of such polyenes, which may contain $NF_2$ groups can be reacted with liquid $N_2O_4$ at about −10° C. to +10° C. to add nitrogen oxide groups to the double bonds.

In the examples given, the treatment with liquid $N_2O_4$ was carried out under ambient pressure developed at the temperature of treatment, but the pressure may be to above or below 1 atmosphere pressure.

What is claimed is:

1. Method of separating an unsaturated organic compound from a mixture with an $NF_2$ saturated adduct of said compound which comprises reacting the unsaturated compound in said mixture at about −10° C. to +10° C. with liquid $N_2O_4$, and recovering as a product the $NF_2$ saturated adduct which does not react with the $N_2O_4$.

2. The method of claim 1 in which the unsaturated compound is reacted with liquid $N_2O_4$ at a temperature in the range of about −10° to +10° C. in a ratio of about 1 molecule $N_2O_4$ per double bond in the unsaturated compound, any excess $N_2O_4$ is removed from the resulting mixture containing $N_2O_4$ reacted unsaturated compound, and the unreacted $NF_2$ saturated adduct is then distilled off under vacuum as distillate product to leave the $N_2O_4$ reacted compound as a residue.

3. Method of separating a saturated higher $NF_2$ adduct of an unsaturated organic compound from a lower $NF_2$ adduct of said compound having a remaining double bond, said adducts being in a mixture and said higher $NF_2$ aduct being distillable under vacuum at 0° C. to 100° C., comprising the steps of reacting at about −10° to +10° C. the lower $NF_2$ adduct in the mixture with liquid $N_2O_4$ to form a nitrogen- and oxygen-containing product that is less volatile than the saturated higher $NF_2$ adduct, and distilling said higher $NF_2$ adduct under vacuum from the less volatile nitrogen- and oxygen-containing product.

4. The method of claim 3 in which the higher $NF_2$ adduct is tetrakis $NF_2$ adduct of dioxadiene and the lower $NF_2$ adduct is bis $NF_2$ adduct of dioxadiene having a remaining double bond.

5. The method of claim 3, in which the higher $NF_2$ adduct is tetrakis $NF_2$ adduct of furan and the lower $NF_2$ adduct is bis $NF_2$ adduct of furan leaving a remaining double bond.

6. Method of treating a mixture of unsaturated $NF_2$ polyene adducts and $NF_2$ saturated adducts of a polyene to react double bonds of the unsaturated adducts with $N_2O_4$, which comprises reacting the unsaturated $NF_2$ adducts in the mixture with liquid $N_2O_4$ at a temperature in the range of about −10° C. to +10° C., and obtaining a resulting product of the $NF_2$ saturated adducts mixed with resulting saturated adducts of the polyene containing $NF_2$ and nitrogen oxide groups.

References Cited

UNITED STATES PATENTS 2,586,777  2/1952  Bond _____ 260—677

NICHOLAS S. RIZZO, *Primary Examiner.*

R. L. CAMPBELL, L. D. ROSDOL, *Examiners.*

J. W. WHISLER, *Assistant Examiner.*